United States Patent
Kushner et al.

(10) Patent No.: US 10,409,501 B1
(45) Date of Patent: Sep. 10, 2019

(54) TIERED DATA STORAGE SYSTEM USING MOBILITY SCORING

(71) Applicant: EMC IP Holding Company LLC, Hopkinton, MA (US)

(72) Inventors: Peter Kushner, Fiskdale, MA (US); Jonathan Krasner, Coventry, RI (US); Chakib Ouarraoui, Watertown, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/834,532

(22) Filed: Dec. 7, 2017

(51) Int. Cl.
*G06F 12/00* (2006.01)
*G06F 3/06* (2006.01)

(52) U.S. Cl.
CPC ............ *G06F 3/0616* (2013.01); *G06F 3/065* (2013.01); *G06F 3/0631* (2013.01); *G06F 3/0689* (2013.01)

(58) Field of Classification Search
CPC ...... G06F 3/0616; G06F 3/065; G06F 3/0631; G06F 3/0689

USPC ......................................................... 711/114
See application file for complete search history.

(56) References Cited

U.S. PATENT DOCUMENTS

| | | | |
|---|---|---|---|
| 9,703,664 B1 * | 7/2017 | Alshawabkeh | G06F 11/3414 |
| 2018/0129443 A1 * | 5/2018 | Karve | G06F 3/0683 |

* cited by examiner

*Primary Examiner* — Mardochee Chery
(74) *Attorney, Agent, or Firm* — Krishnendu Gupta; Jason Reyes; Anne-Marie Dinius

(57) ABSTRACT

The system and methods disclosed herein relate to an improvement in automated data tiering technology. In these embodiments, users are able to weigh the importance of read, write, and pre-fetch operations in terms of tier placement within the data storage system. Data relocation evaluations are performed by an off-load engine, e.g., a graphics processing unit, which utilizes parallel processing on data arrays/vectors/extents. The data relocation candidates are identified via calculating a mobility score on an extent-by-extent basis. Data are then relocated within the various tiers of the data storage system.

16 Claims, 5 Drawing Sheets

TIERED DATA STORAGE SYSTEM USING MOBILITY SCORING

FIELD OF THE INVENTION

This disclosure relates to tiered data storage systems, and, more particularly, to a system and method for improving data movement within the tiers based on data temperature calculations.

BACKGROUND

Data has a lifecycle. As data progresses through its lifecycle, it experiences varying levels of activity. When data is created, it is typically used heavily. As it ages, it is typically used less frequently. In recognition of this, developers have worked to create systems and methods for ensuring that heavily used data are readily accessible, while less frequently used data are stored in a more remote location. Correlations between location of data storage and frequency of access to data are necessary because storage has an inherent cost. Generally speaking, the faster the storage medium is at providing access to data, the costlier the storage medium.

Two concepts relevant to the tradeoffs between data usage and storage costs are relevant for purposes of the embodiments disclosed herein. First, data storage systems involving tiered storage have emerged. These systems include multiple tiers of non-volatile storage with each tier providing a different quality of service. For example, a system may include a first tier (Tier 1) for SSDs (solid state drives) or cache, a second tier (Tier 2) for SAS (Serial-Attached SCSI) drives, and a third tier (Tier 3) for SATA (Serial Advanced Technology Attachment) drives, for example. In alternate arrangements of tiered storage, a cloud-based storage system could be implemented as Tier 2 or Tier 3 storage. As advances in data storage mediums and speeds are recognized over time, the types of storage used and the tiers in which they are used may vary.

Tiered data systems manage placement of data on the different storage tiers to make the best use of disk drive speed and capacity. For example, frequently accessed data may be placed on Tier 1 storage. Less frequently accessed data may be placed on Tier 2 storage. And seldom accessed data may be placed on Tier 3 storage.

The second concept of importance is the notion of categorizing data so that it can be stored on the most appropriate tier. Temperature variance has been used as a framework for distinguishing between data that is frequently used, i.e., "hot" as compared to less frequently used data, or "cold" data.

A significant challenge in the categorization of data within tiered data storage systems is the effect time has on data categorization. Typically, data are hot for a limited amount of time. In addition, determining the data temperature also consumes computing resources requiring prudence in judging how frequently to assess the temperature of the vast amounts of data that can be stored in a database. Furthermore, moving data among the tiers also consumes substantial computing resources, which again necessitates tradeoffs in terms of overall resource allocation.

Some data storage systems perform automatic storage tiering. These systems monitor the activity of storage elements and move data between storage tiers to best utilize available resources and promote efficiency. For example, a Tier 2 data set may be moved to Tier 1 if the automated system determines the data have become hotter. Similarly, data may be demoted from Tier 1 to Tier 2 if the system determines the data have become colder.

Automated storage tiering algorithms are typically run on a central processing unit, which is itself part of the data storage system. The system resources required to compute data temperatures for purposes of assessing whether data should be reallocated to a different tier are significant, especially for large enterprise databases. In addition, once the system determines which data should be moved from one tier to another, executing the various read/write/copy functions necessary to move the data from one tier to another is additionally resource intensive. Further compounding the data movement issue is the fact that the temperature of the data is in constant flux.

In order to address these, among other issues, typical automated storage tiering systems perform pre-scheduled reviews of data use statistics. Within a given scheduled review window, the system's CPU is tasked with evaluating data temperature, identifying candidate data segments for promotion/demotion within the tiered storage, and moving the identified data segments to a new tier. The window within which these tasks are performed is finite. If the system is unable to complete all of the tasks, some of the data will not be moved; and the system will begin again with evaluating data temperature in the next scheduled review period. For each cycle where data are unable to be relocated, database performance could degrade and storage level objectives may be missed.

Review cycle times are typically governed by the service level agreement. By way of example, and without limitation, a review cycle may be one a day, every hour, or as often as every ten minutes. Once a review cycle has been completed, the system is tasked with relocating data that has been flagged for tier relocation. If all of the data that has been flagged for relocation is not relocated within the allocated timeframe, the analysis must start afresh because data temperature is in constant flux. In other words, historic read/write/pre-fetch statistics are not reusable from one review cycle to the next.

Users can specify criteria to be used when making determinations for data promotion/demotion. These criteria are typically part of the service level agreement for the data storage system. In addition, users can alter the timeframe for, and the period within which, promotion/demotion analytics are gathered and executed. Even with this flexibility, however, there are still a number of inefficiencies, for example, and without limitation, the use of CPU processing power to perform backend functions reduces the amount of CPU power for client-facing operations. Second, if during a given promotion/demotion evaluation cycle, there is insufficient time to perform the recommended promotions/demotions, database performance continues to degrade by virtue of improper tier locations for data. Third, if data relocation is not completed within a given cycle, some of the CPU power devoted to calculating relocation candidates would be wasted because that task must be performed again in the next review cycle. There is thus a need for a backend data promotion/demotion engine to address these and other shortcomings in the art.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter that is set forth by the claims presented below. All examples and features mentioned below can be combined in any technically possible way.

The system and methods disclosed herein relate to an improvement in automated data tiering technology. In these embodiments, users are able to weigh the importance of read, write, and pre-fetch operations in terms of tier placement within the data storage system. Data relocation evaluations are performed by an off-load engine, e.g., a graphics processing unit, which utilizes parallel processing on data arrays/vectors/extents. The data relocation candidates are identified via calculating a mobility score on an extent-by-extent basis. Data are then relocated within the various tiers of the data storage system.

DETAILED DESCRIPTION

Figure 1:
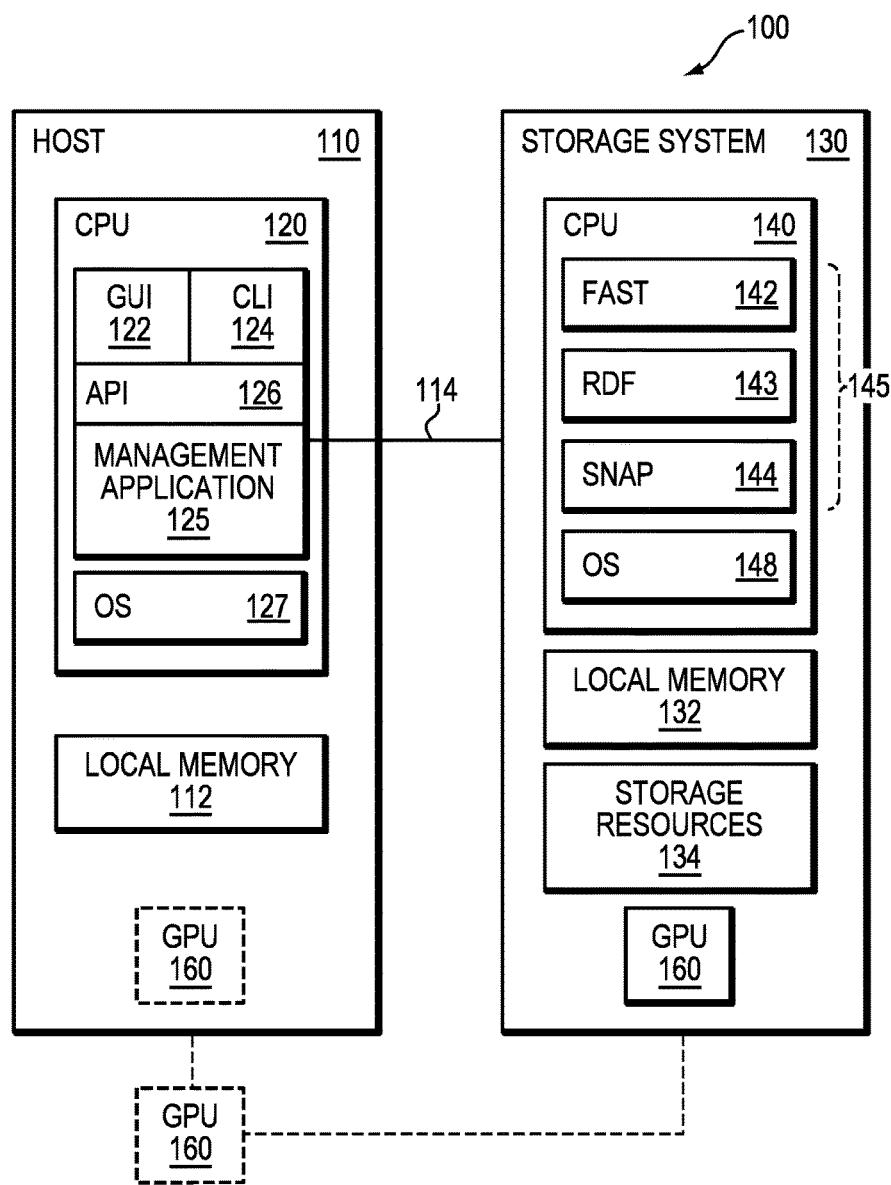
FIG. 1 is a functional block diagram of an exemplary tiered data storage environment configured to improve the efficiency with which data are evaluated and moved from tier to tier according to embodiments.

FIG. 1 shows an example storage environment 100 including a host 110 and a storage system 130. Host 110 and storage system 130 are connected by communication channel 114 to enable host 110 to control operation of the storage system 130.

Host 110, in some embodiments, is a computer having one or more Central Processing Units 120 and local memory 112. An operating system 127 executes on CPU 120, which enables CPU 120 to execute one or more instances of storage system management application 125. The storage system management application 125 has a set of storage system Application Program Interfaces (APIs) 126 that enables the storage system management application 125 to control execution of applications 145 running within a processing environment of the storage system 130.

The storage system management application 125 has a Command Line Interface 124 that enables users to manually input data to the storage system management application 125. By setting information into the storage system management application 125, the user can control how the storage system management application 125 adjusts operation of the applications 145 running on the storage system 130. Through the use of the CLI 124, a user can set various parameters, such as the relative priority of the various applications 145, the Quality of Service (QoS) each application should receive, I/O limits for the applications 145, and other similar types of parameters. The CLI 124 thus allows the management application user to control execution of the applications 145 running on the storage system 130 to ensure that the applications 145 running on storage system 130 are executing to provide access to data in a manner consistent with the user's objectives. In some embodiments, the CLI 124 and API 126 are consolidated into a single software layer. One example CLI 124 is available from Dell EMC™ and referred to as Solutions Enabler.™ Other command line interfaces may likewise be created and used to interact with and control execution of the storage system management application 125.

In some embodiments, a Graphical User Interface (GUI) 122 is built on top of the API 126. GUI 122 consolidates operations to facilitate control of applications 145 using a more user-friendly interface than the CLI 124. One example GUI 122 is available from Dell EMC™ and referred to as Unisphere.™ Other graphical user interfaces 122 may likewise be created and used to interact with and control execution of the storage system management application 125. In some embodiments, GUI 122 facilitates interaction between the user and storage system management application 125, for example to enable the user to make provisioning decisions, generate reports, and ensure the health of all systems in the storage environment 100. In some implementations, GUI 122 allows the user to remotely create storage resources on the storage system 130, configure and schedule data protection protocols managed by storage system 130, and manage and monitor storage operations of storage system 130.

Although GUI 122 is shown in FIG. 1 as implemented on host 110, it should be understood that in some embodiments GUI 122 may be implemented using a client/server model. Accordingly, depending on the implementation, the components described in conjunction with FIG. 1 may be implemented on one or more separate networked processing environments.

In some embodiments, the storage system management software 125 is configured to enable the user to perform service level provisioning to specify the quality of service provided by the applications 145 running on storage system 130. Quality of service may be set on a per application per channel basis, per application for a group of channels, for a Storage Resource Pool (SRP), for a set of SRPs, or for some other measurable basis. As used herein, the term Quality of Service (QoS) will be used to refer to performance parameters of the Storage System 130. Example performance parameters that may be specified as QoS may include response time and other measurable performance related parameters. When a user specifies service level parameters for an application 145, the storage system management application 125 adjusts the priority, I/O limits, and other performance aspects of the impacted application 145, and optionally other applications 145 also running on the storage system 130, to enable the storage system 130 to meet the provisioned service level.

As shown in FIG. 1, the storage system 130, like host 110, has a CPU 140 and local memory 132. Storage system 130 may have multiple CPUs 140. An operating system 148 executes on CPU 140 to control storage resources 134 and enable execution of applications 145. Applications 145 manipulate data stored in storage resources 134. Operating systems 127, 148 could be Linux systems in some embodiments.

Figure 2:
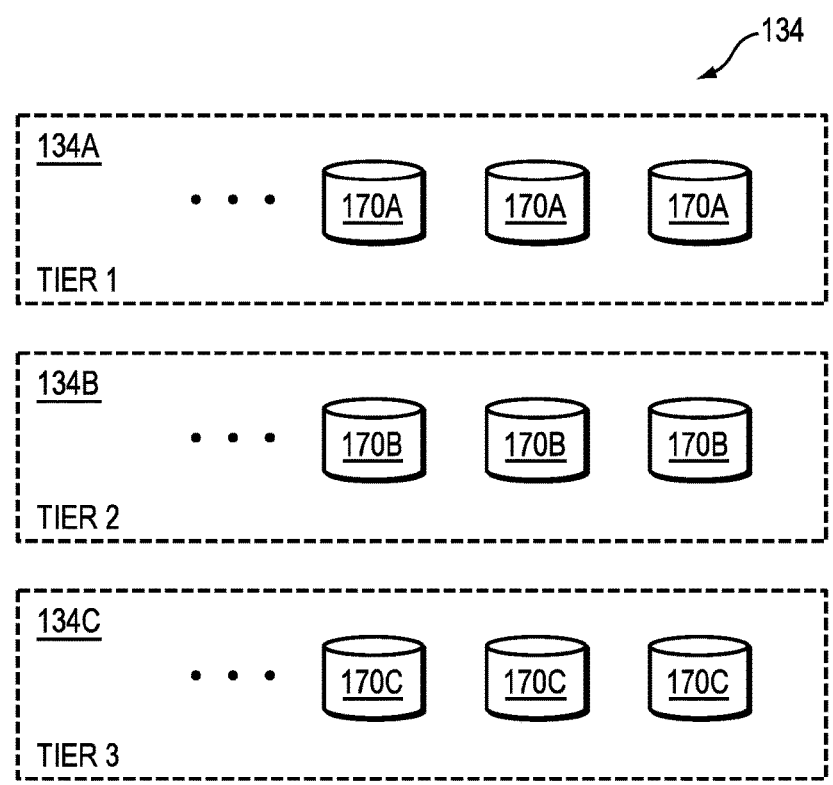
FIG. 2 is a functional block diagram of an exemplary tiered storage environment configured to provide efficient data relocation among the tiers according to embodiments.

Storage resources 134 may be implemented using a number of different storage technologies. In some implementations storage resources 134 are configured as tiered storage, as depicted in FIG. 2. A tiered storage system 134 is a storage system that supports storage tiers 134A, 134B, 134C for which the operational costs per unit of input/output operation processing, on a per unit of storage capacity, are different. Differences may be due to the use of different underlying drive technologies, such as Enterprise Flash Drives (EFD) or other solid-state drives, Fiber Channel (FC)

drives, and Serial Advanced Technology Attachment (SATA) drives. Alternatively, the differences between storage tiers 134A, 134B, 134C may be due to different strategies for leveraging storage capacity, such as through compression, or the use of different power management strategies. Many ways of differentiating storage capabilities may be used to identify and define tiers 134A, 134B, 134C of storage in a tiered storage system.

Applications 145 execute within storage system 130 to access and operate on storage resources 134. By way of example and without limitation, one application 145 is a Fully Automated Storage Tiering (FAST) application 142, configured to move data between tiers of storage resources 134 within storage system 130. Different groups of storage resources (storage resource pools) may be separately managed by individual FAST applications. Hence a given storage system 130 may have multiple instances of FAST application 142 executing therein at the same time.

Another example application is a Remote Data Forwarding (RDF) application 143, which causes subsets of data stored within storage resources 134 to be mirrored to one or more similar remote storage systems (not shown). The RDF application 143 also allows data stored by other remote storage systems (not shown) to be mirrored to the storage system 130 and stored within the storage resources 134. A given storage system 130 may operate as a primary node or secondary node in many mirroring pairs, and hence multiple RDF applications 143 may simultaneously execute on storage system 130 to control participation of storage system 130 in the mirroring operations.

Another example application that may be executed by CPU 140 may be a snapshot application (SNAP) 144 configured to provide point-in-time data copying. A snapshot is a copy of data as that data existed at a particular point in time. Multiple SNAP applications 144 may be executing on a given storage system 130. Other applications 145 may likewise be executing on storage system 130. The particular set of applications 145 will depend on the particular implementation.

FIG. 2 shows an embodiment of storage resources 134 implemented in three tiers, namely Tier 1 134A, Tier 2 134B, and Tier 3, 134C. Each of the storage tiers 134 has multiple physical discs 170A, 170B, 170C, which collectively provide storage for the respective tier. Although FIG. 2 depicts three (3) physical disks 170 per tier 134, alternative design implementations could be realized. For example and without limitation, the number of disks 170 per tier 134 could be varied. In addition, cloud storage at any given tier 134 could be realized.

As noted above, FAST application 142 operates to move data within storage resources 134, such as between storage tiers 134A, 134B, and 134C to optimize access to data stored within storage resources 134. When FAST application 142 is run, it utilizes CPU 140 to determine and flag data segments as candidates for relocation. In addition, CPU 140 performs the necessary processes to effectuate promotion/demotion among the tiers 134A, 134B, and 134C.

Service level provisioning in storage system 130 ensures that storage 130 is provisioned with a set expectation for performance, for example system response time. FAST 142 and other aspects of the Operating System 148 coordinate to achieve QoS targets as established within the service level agreement(s). An additional means of achieving QoS, as discussed previously, is to run automated tiering software on the backend. This, however, has the drawback of consuming CPU 140 resources, which in turn reduces the amount of I/O operations the storage system 130 is able to process.

In some embodiments, storage administrators may want to limit the amount of I/O (I/OPS) or bandwidth (MB/s) a particular application 145 can drive on the storage system. Accordingly, storage system management application 130 enables the user to specify performance targets for the applications 145 as well as to define limits to enforce service level agreements and make application performance more predictable. Host I/O limits features allows the user to limit front-end port performance by either I/OPS, Host MB per host, or both. The limits may be set for particular storage resource pools, on a per channel basis, or on another basis. Once set by the administrator, the bandwidth and I/Os controls are then monitored by the storage system 145 to attempt to meet the defined service level agreements while also ensuring that the applications 145 do not exceed the specified maximum bandwidth or maximum I/OPS.

The storage system management application 125 enables the user to set priorities for the applications 145 to realize the overall service level agreements for the applications 145 under control. The storage system management application 125 allows the user to monitor operation of the storage system 130 to determine whether it is achieving the QoS requirements specified in the service level agreement. If the QoS targets are not being met, the user can use the GUI 122 or the CLI 124 to adjust priorities of the applications 145 to better enable the storage system 130 to operate in accordance with its service level agreement. For example, the user may prioritize FAST 142 over other applications 145. Different priorities may be set for different channels, such that each iteration of the applications is adjusted to allow the QoS to be met within the channel.

FIG. 1 also includes an off-load engine within the storage environment 100, which in embodiments can be a graphics processing unit ("GPU") 160. Throughout this specification, the terms "off-load engine," "graphics processing unit," and "GPU" are used interchangeably without limitation. In some embodiments, GPU 160 is internal to the storage system 130. In an alternate embodiment, GPU 160 is located internal to host 110. In yet an additional embodiment, GPU 160 could be external to storage system 130 or host 110, instead being communicatively coupled to either storage system 130 or host 110.

As previously stated, storage tiering is the movement of data to different types of storage areas, e.g., disks or cloud-based systems, in accordance with network performance and capacity requirements. In a typical storage environment 100, 95% of application data has little I/O activity. Tiering takes this fact into account by allowing the majority of data to reside in slower, cheaper storage areas, while simultaneously ensuring that the most active data are stored on the fastest drives, e.g., Fibre Channel, or flash solid state drives ("SSD").

In an exemplary storage system 130, Tier 1 134A could be an extreme performance tier. The extreme performance drives 170A could be comprised of flash technology SSDs, which contain no moving parts. Flash drives have a higher per-GB storage cost, but a lower input/output ("I/O") cost compared with spinning drives. In this embodiment, Tier 1 134 would contain "hot" data, i.e., data that typically requires fast response time and/or high I/O per second.

In this exemplary storage system 130, Tier 2 134B could be designated as the performance tier. The performance tier 134B could be used to store "warm" data. In Tier 2 134B, it is possible to achieve a combination of performance and capacity. In one embodiment, the performance tier drives 170B could be comprised of Serial Attached SCSI ("SAS") drives. SAS drives are based on industry-standardized, enterprise level, mechanical hard-drive technology that stores digital data on a series of rapidly rotating magnetic platters. In an additional embodiment, Tier 2 134B could be a cloud-based storage system. The performance tier 134B offers high, all-around performance with consistent response times, high throughput, and good bandwidth at a mid-level price point.

In this exemplary storage system 130, Tier 3 134C could be used to store "cold" data. Tier 3 134C could be referred to as a capacity tier. The capacity tier 134C is often used to decrease the cost per GB of data storage. In one embodiment, the capacity tier drives 170C could be RPM Near-Line SAS ("NL-SAS") drives. Although NL-SAS drives have a slower rotational speed than the SAS drives used in the exemplary performance tier 134B, the NL-SAS drives significantly reduce energy use and free up capacity in the more expensive, higher performance tiers 134A and 134B. In an alternate embodiment, Tier 3 134C could be a cloud-based storage system.

Data relocations can be done on a per-storage-extent basis, i.e., at the granularity of an individual storage extent. As is known, a "storage extent" is an increment of contiguous storage, such as a block or a slice. A "block" is the smallest unit of storage that may be allocated to a data object and may be, for example, 8 KB in size, although block sizes can vary considerably. A "slice" is the smallest unit of storage that may be provisioned to a data object. Typical slice sizes are 256 MB or 1 GB. As used herein, the term storage extent or extent is intended to cover not only units, like blocks or slices, but also larger structures built from such units, such as LUNs, storage pools, arrays, vectors, and even an entire data set within a database. It should be understood that the definition of storage extent is intended to be flexible. For example, a storage extent may be a physical extent or a logical extent. Also, the particular examples of storage extents provided herein are intended to be merely illustrative.

In terms of user control over automated tiering, users can define a tiering policy. The tiering policy specifies the tier 134 within which new data will be placed as well as how data will be relocated to an alternate tier 134 during scheduled and manually invoked relocation periods. By way of example, a tiering policy could utilize the highest available tier. In a highest available tiering policy, data could be placed in the highest performing tier until that tier was full, at which point, data would be placed in the next highest performance tier having capacity.

An alternative tiering policies is a lowest available tier policy. In a lowest tiering policy, data are placed in the lowest performing tier 134 until that tier is full, at which point, data is placed in the next lowest available tier. A user could define a "no data movement" tiering policy as well. In this type of tiering policy, data are moved within a tier 134, but not from one tier 134 to another.

Figures 3A, 3B:
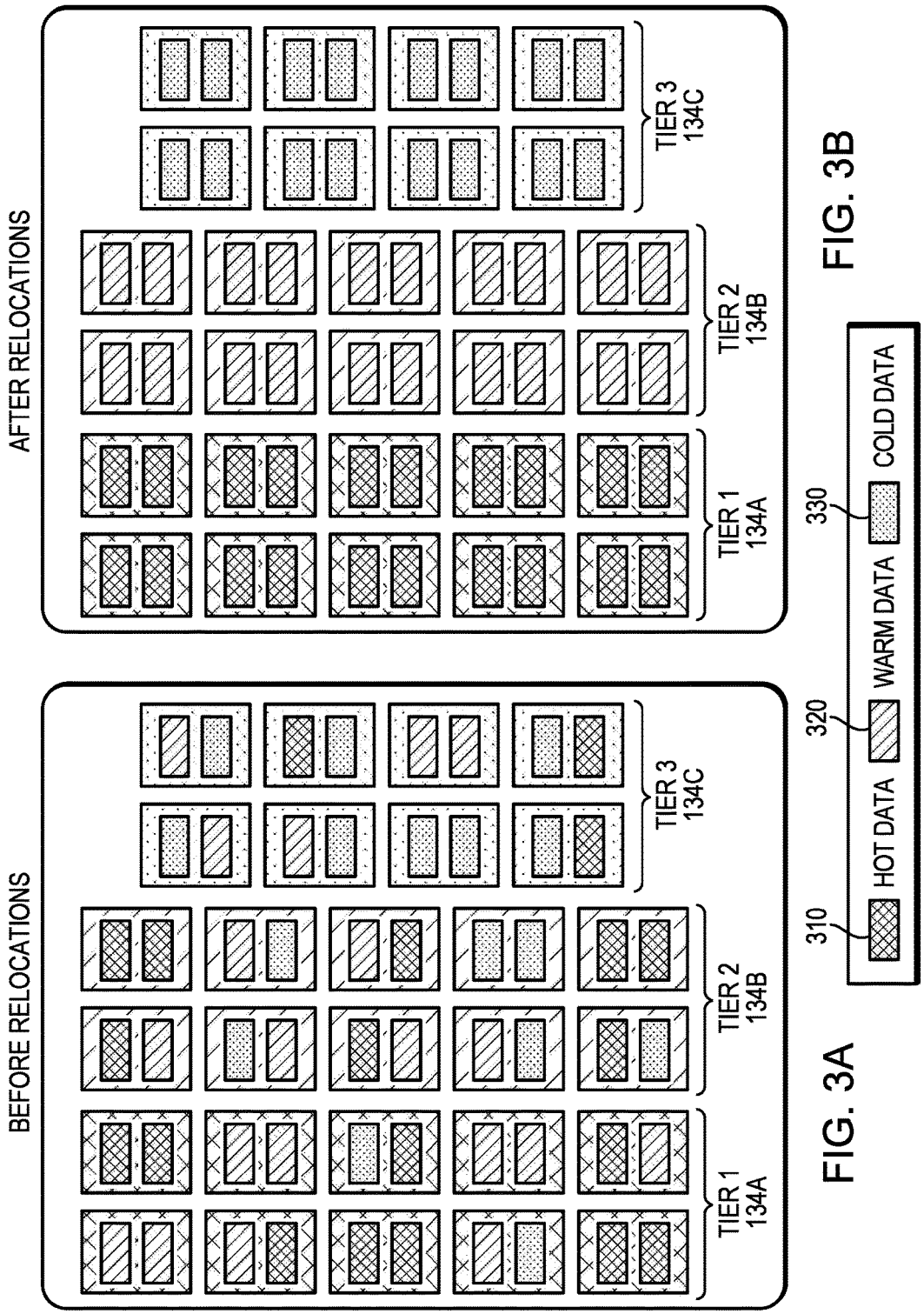
FIGS. 3A and 3B are functional block diagrams of an exemplary tiered storage environment showing automated data relocation according to embodiments.

Of particular relevance for the present invention is an automatic tiering policy. Auto-tiering policies automatically relocate data to the most appropriate level based on the activity level of each storage extent. Data are relocated based upon the highest available tier 134 and the storage extent's temperature. FIG. 3A illustrates a typical tiered storage system 130 before data have been relocated using an auto-tiering policy. The storage system 130 has storage resources 134 comprised of a three tiers 134. Data extents are distinguished in FIGS. 3A and 3B based on its activity level, i.e., the frequency with which the extent is accessed for purposes of a read, write, or pre-fetch function within the data storage system 130. In an auto-tiering data storage system, the most active, or hot, data are ideally located in Tier 1 134A. The moderately used, or warm, data are ideally located in Tier 2 134B. And the least used, or cold, data are ideally stored in Tier 3 134C.

As can be seen in FIG. 3A, hot data 310, warm data 320, and cold data 330 are interspersed among the tiers 134. In an ideal environment, hot data 310 would reside in Tier 1 134A; warm data 320 would be in Tier 2 134B; and cold data 330 would be in Tier 3 134C. As a result of the mismatch between data temperature and tier location, the data storage environment 100 will experience sub-optimal performance. Specifically, in this mismatched state, the data storage environment 100 will experience at least the following sub-optimal conditions: increased latency, increased cost of data storage, and increased energy consumption. FIG. 3B shows the same tiered storage system 134 after data have been relocated.

Figure 4:
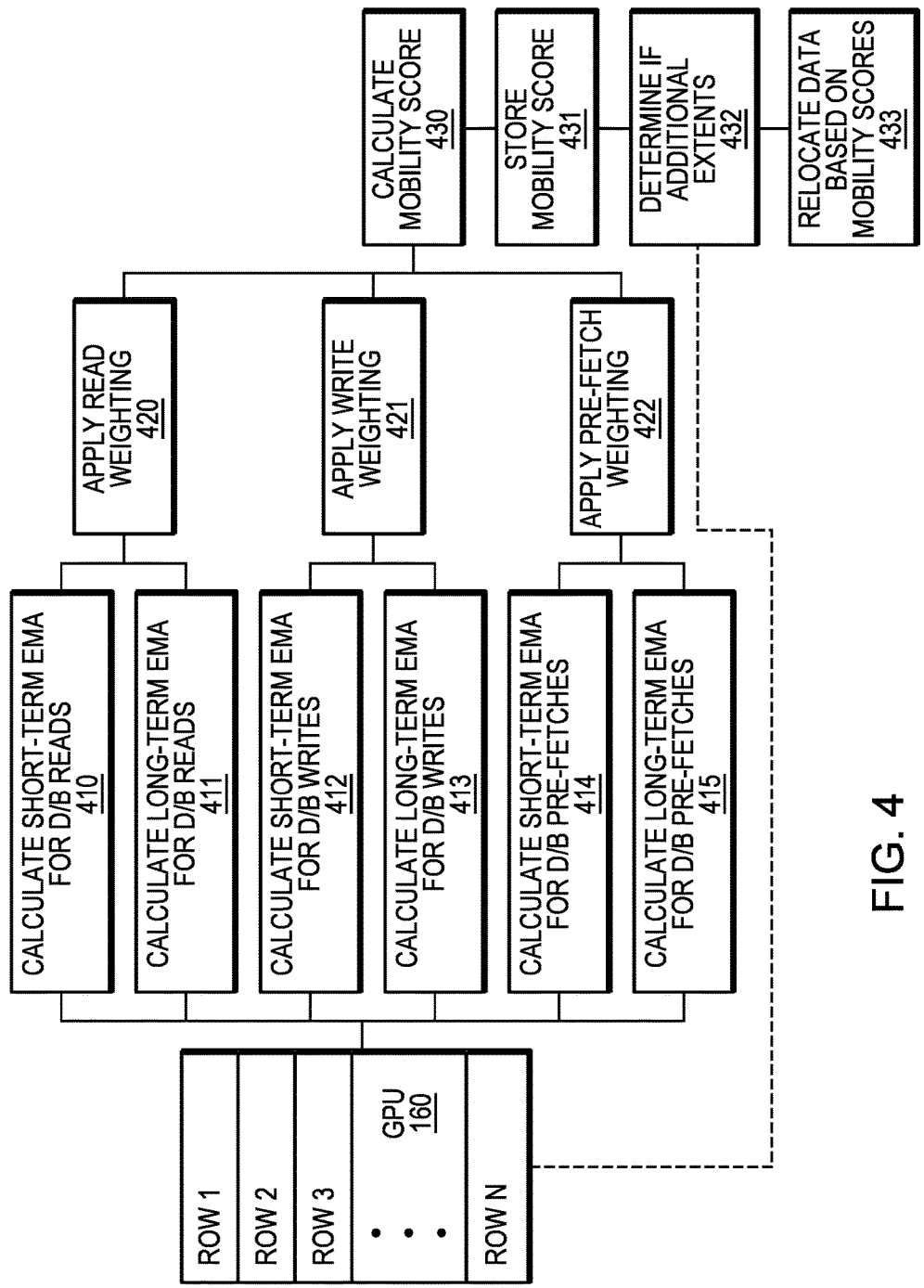
FIG. 4 is a flow diagram showing exemplary steps of method embodiments disclosed herein.

FIG. 4 depicts a flow diagram showing the steps of method embodiments designed to correct the mismatch of data with respect to tiers shown in FIG. 3A. In order to improve the functionality of the tiered storage 134, the systems and methods disclosed herein calculate a mobility score on a per-extent basis. The per-extent mobility score is then used to relocate extents based on their temperature. In an exemplary embodiment, these calculations and the subsequent relocations are performed in and by a GPU 160. In alternate embodiments, the calculations could be performed in a CPU 120, 140, multiple GPUs 160, multiple CPUs 120, 140, or any combination thereof. Additionally, exemplary data storage resources 134 could be a database such as an SQL database, a SQL-Lite database, or similar relational data storage systems known to those in the art.

FIG. 4 shows a GPU 160 having N-rows of data extents stored therein. The extents stored in GPU 160 correspond to an up-to-date version of the data stored in data storage resources 134. Accordingly, each row has experienced a certain number of read, write, and pre-fetch operations since the last time data was relocated. Typically, the data relocation time interval is set by users and is part of the service level agreement governing the particular data storage environment 100. In an embodiment, the data relocation interval could be ten minutes. In alternate embodiments, the timeframe could be greater or smaller.

To begin the automated data relocation/tiering process, systems and methods disclosed herein calculate an exponential moving average for read, write, and pre-fetch operations that have occurred since the last relocation operation was successfully completed. The mobility score for each extent is calculated as follows:

$$score=(r*(readEMAS+readEMAL))+(w*(writeEMAS+writeEMAL))+(p*(prefetchEMAS+prefetchEMAL))$$

FIG. 4 shows method steps for calculating a mobility score for each extent/row. First, a short-term exponential moving average and a long-term exponential moving average is calculated for the read 410, 411, write 412, 413, and pre-fetch 414, 415, operations that have been performed on a particular row or extent during the relocation interval. Next, a weighting factor, r, w, p, respectively, is applied 420, 421, 422 to the sum of exponential moving averages for the read, write, and pre-fetch operations.

The weighting factors can be used in embodiments to compensate for factors such as the long time required to perform a write operation as opposed to a read or pre-fetch operation. Changes in coefficients r, w, p will affect mobility scores such that the higher the coefficient chosen, the more that operation will be weighted. For example, if a user wishes to have data associated with read operations, that is data most likely to be read in the future, migrate to the highest available tier, he/she could choose a larger value for r than for w or p. In some embodiments, weighting factors could be altered automatically based on the real-time speeds required for read, write, and pre-fetch operations coupled with a particular user's preferences for relative read, write, and pre-fetch speeds.

Figure 5:
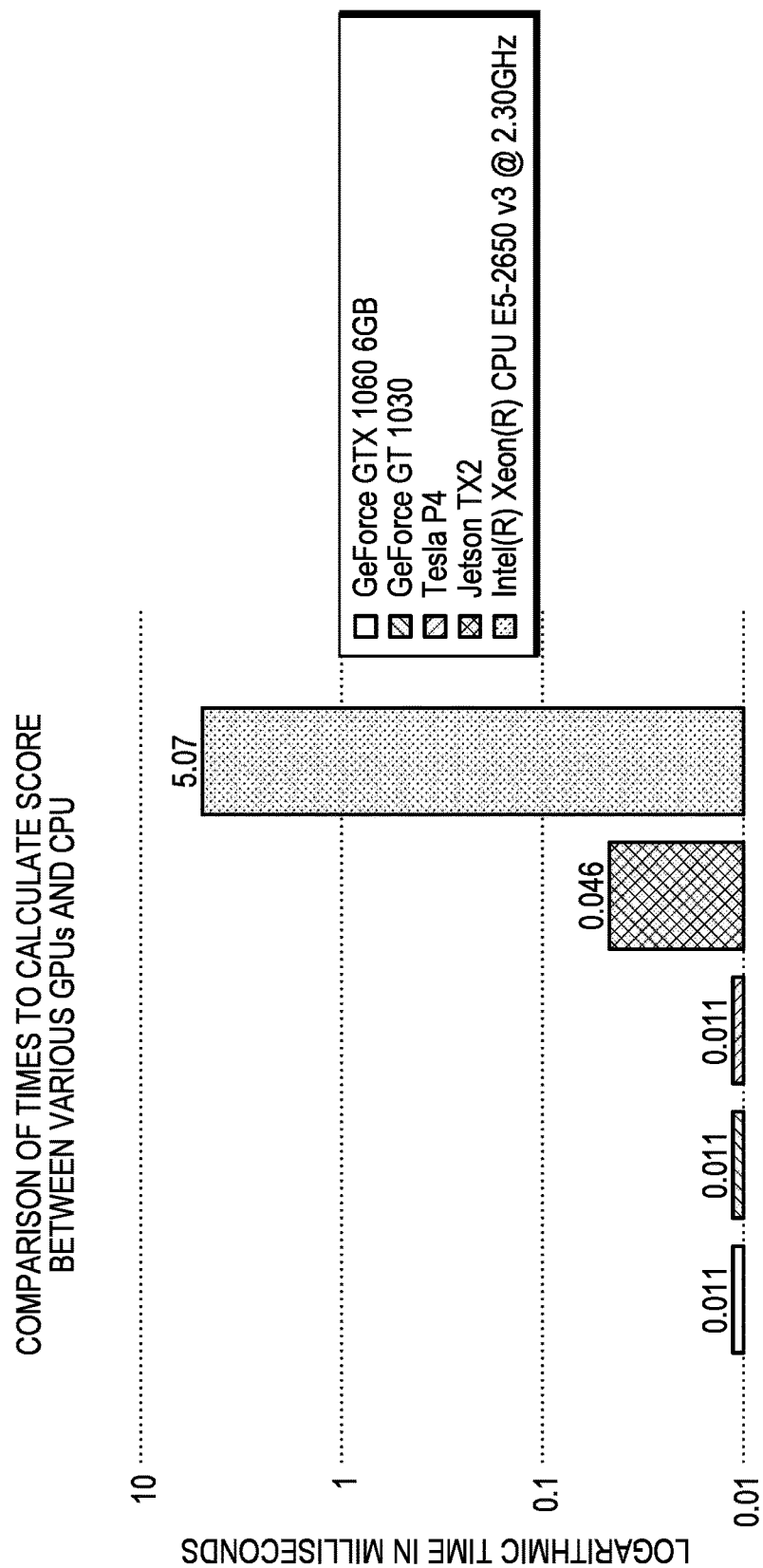
FIG. 5 is a table showing a comparison of times to calculate scores between various GPUs and CPU.

In terms of defining a timeframe for "short-term" and "long-term," these values could be specified in the service level agreement or as part of user-input to the method steps delineated herein. In an exemplary embodiment, short-term could be a 24-hour half-life forecast. Long-term could be a 5-day half-life forecast. In an exemplary embodiment using a relational database having 2,007,470 rows, the systems and methods disclosed herein improved mobility calculation speeds significantly as compared with conventional prior art mobility score calculations. See FIG. 5.

Next, a mobility score is calculated 430 for the entire extent/row. The mobility score is then stored 431 in local memory 132. These steps are then repeated 432 for each data extent or row within the GPU 160. Once all mobility scores for each row/extent have been calculated 430, data are relocated 433 based on mobility score. The higher the score, the hotter the extent.

In some embodiments, the GPU 160 is able for perform these calculations in parallel, which is much faster than typical CPU calculations because CPU calculations are typically performed in series. The methods disclosed herein advantageously increase processing speed and more efficiently allocate data storage in a tiered system. These methods also provide greater certainty that data flagged for relocation will be successfully relocated among the tiers within a relocation cycle.

In additional embodiments, a vector manipulation program could be used to expedite mobility score calculations. In additional embodiments, the method steps could be performed on an entire data set rather than on a row-by-row basis as shown in FIG. 4.

The methods described herein may be implemented as software configured to execute in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as random-access memory, a computer memory, a disk, or other storage medium. All such embodiments are intended to fall within the scope of the present invention.

The methods described herein improve the operation of storage system 130, in that the methods change how the storage system 130 adjusts execution of applications 145 to cause execution of the applications 145 to meet specified service level objectives. In particular, using weighting and an off-load engine, the method described herein enable the storage system 130 to reliably meet specified quality of service settings.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

The following reference numbers are used in the drawings:
  100 storage environment
  110 host
  112 host local memory
  114 communication channel
  120 host CPU
  122 host graphical user interface
  124 host command line interface
  125 storage system management application
  126 application program interface
  127 host operating system
  130 storage system
  132 storage system local memory
  134 storage system resources or tiered storage
  140 storage system central processing unit
  142 storage system application—Fully Automated Storage Tiering ("FAST")
  143 storage system application—Remote Data Forwarding ("RDF")
  144 storage system application—Snapshot Application ("SNAP")
  145 storage system applications
  148 storage system operating system
  160 graphics processing unit
  170 memory storage drive
  310 hot data
  320 warm data
  330 cold data
  410-415 calculate short- and long-term exponential moving averages
  420-422 apply weighting
  430 calculate mobility score
  431 store mobility score
  432 determine if additional extents or arrays or vectors
  433 relocate data based on mobility scores Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for tiering data in a data storage device using an offload engine to calculate a mobility score comprising:
    using the offload engine to calculate a weighted, short-term moving exponential average for a plurality of read operations performed on a first extent stored in the data storage device;

using the offload engine to calculate a weighted, short-term moving exponential average for a plurality of write operations performed on the first extent;
using the offload engine to calculate a weighted, short-term moving exponential average for a plurality of pre-fetch operations performed on the first extent; and
evaluating a tier location of the first extent based on the weighted, short-term moving exponential averages for the plurality of read, write, and pre-fetch operations to determine if the first extent should be moved to a new tier location.

2. The method of claim 1 further comprising moving the first extent to the new tier location.

3. The method of claim 1 wherein the offload engine is a graphics processing unit.

4. The method of claim 1 further comprising:
using the offload engine to calculate a weighted, long-term moving exponential average for the plurality of read operations performed on the first extent stored in the data storage device;
using the offload engine to calculate a weighted, long-term moving exponential average for the plurality of write operations performed on the first extent;
using the offload engine to calculate a weighted, long-term moving exponential average for the plurality of pre-fetch operations performed on the first extent; and
wherein the evaluating a tier location of the first extent is further based on the weighted, long-term moving exponential averages for the plurality of read, write, and pre fetch operations to determine if the first extent should be moved to a new tier location.

5. The method of claim 4 wherein the offload engine is a graphics processing unit.

6. A method for tiering data in a data storage device using, an offload engine to calculate a mobility score comprising:
using the offload engine to calculate a weighted, long-term moving exponential average for a plurality of read operations performed on a first extent stored in the data storage device;
using the offload engine to calculate a weighted, long-term moving exponential average for a plurality of write operations performed on the first extent;
using the offload engine to calculate a weighted, long-term moving exponential average for a plurality of pre-fetch operations performed on the first extent; and
evaluating a tier location of the first extent based on the weighted, long-term moving exponential averages for the plurality of read, write, and pre-fetch operations to determine if the first extent should be moved to a new tier location.

7. The method of claim 6 further comprising moving the first extent to the new tier location.

8. The method of claim 6 wherein the offload engine is a graphics processing unit.

9. A tiered data storage system comprising:
a processor;
a storage resource;
a memory; and
an offload engine configured for:
using the offload engine to calculate a weighted, short-term moving exponential average for a plurality of read operations performed on a first extent stored in the data storage device;
using the offload engine to calculate a weighted, short-term moving exponential average for a plurality of write operations performed on the first extent;
using the offload engine to calculate a weighted, short-term moving exponential average for a plurality of pre-fetch operations performed on the first extent; and
evaluating a tier location of the first extent based on the weighted, short-term moving exponential averages for the plurality of read, write, and pre-fetch operations to determine if the first extent should be moved to a new tier location.

10. The tiered data storage system of claim 9 further configured for moving the first extent to the new tier location.

11. The tiered data storage system of claim 9 wherein the offload engine is a graphics processing unit.

12. The tiered data storage system of claim 9 further comprising:
using the offload engine to calculate a weighted, long-term moving exponential average for the plurality of read operations performed on the first extent stored in the data storage device;
using the offload engine to calculate a weighted, long-term moving exponential average for the plurality of write operations performed on the first extent;
using the offload engine to calculate a weighted, long-term moving exponential average for the plurality of pre-fetch operations performed on the first extent; and
wherein the evaluating a tier location of the first extent is further based on the weighted, long-terms moving exponential averages for the plurality of read, write, and pre-fetch operations to determine if the first extent should be moved to anew tier location.

13. The tiered data storage system of claim 12 wherein the offload engine is a graphics processing, unit.

14. A tiered data storage system comprising:
a processor;
a storage resource;
a memory; and
an offload engine configured for:
using the offload engine to calculate a weighted, long-term moving exponential average for a plurality of read operations performed on a first extent stored in the data storage device;
using the offload engine to calculate a weighted, long-term moving exponential average for a plurality of write operations performed on the first extent;
using the offload engine to calculate a weighted, long-term moving exponential average for a plurality of pre-fetch operations performed on the first extent; and
evaluating a tier location of the first extent based on the weighted, long-term moving exponential averages for the plurality of read, write, and pre-fetch operations to determine if the first extent should be moved to a new tier location.

15. The tiered data storage system of claim 14 further configured for moving the first extent to the new tier location.

16. The tiered data storage system of claim 14 wherein the offload engine is a graphics processing unit.

* * * * *